United States Patent [19]

Tanaka

[11] Patent Number: 4,862,262
[45] Date of Patent: Aug. 29, 1989

[54] METHOD OF COMPRESSING IMAGE SIGNALS BY VECTOR QUANTIZATION

[75] Inventor: Nobuyuki Tanaka, Kanagawa, Japan

[73] Assignee: Fuji Photo Film Co., Ltd., Kanagawa, Japan

[21] Appl. No.: 160,446

[22] Filed: Feb. 25, 1988

[30] Foreign Application Priority Data

| Feb. 25, 1987 | [JP] | Japan | 62-42113 |
| Feb. 25, 1987 | [JP] | Japan | 62-42114 |
| Feb. 24, 1988 | [JP] | Japan | 63-41715 |
| Feb. 24, 1988 | [JP] | Japan | 63-41716 |

[51] Int. Cl.$^4$ .............................................. H04N 7/12
[52] U.S. Cl. ...................................... 358/133; 358/135
[58] Field of Search ............... 358/136, 135, 133, 260, 358/262; 382/43, 56

[56] References Cited

U.S. PATENT DOCUMENTS

| 4,541,012 | 9/1985 | Tescher et al. | 358/133 |
| 4,558,350 | 12/1985 | Murakami | 358/133 X |
| 4,670,851 | 6/1987 | Murakami et al. | 358/136 X |
| 4,710,812 | 12/1987 | Murakami et al. | 358/136 |

Primary Examiner—James J. Groody
Assistant Examiner—Victor R. Kostak
Attorney, Agent, or Firm—Sughrue, Mion, Zinn, Macpeak & Seas

[57] ABSTRACT

A method of compressing image signals by vector quantization comprises the steps of dividing two-dimensional image signals into blocks B1 each comprising signals at M×N number of adjacent picture elements, selecting a vector that corresponds with the minimum distortion to the image signals in each block B1 from a code book comprising different vectors prepared by defining M×N number of vector elements, and encoding a number representing the selected vector to correspond to each block B1. The number representing the selected vector is defined to be larger or smaller as the distortion of the vector in the code book with respect to a predetermined vector is larger. Group signals of the numbers selected for the blocks B1 are divided into blocks B2 by putting together the group signals at the adjacent blocks B1, orthogonal transformation is carried out for the group signals in each block B2, and the transformed signals are encoded respectively with an intrinsic code length. Or, prediction encoding is carried out for the group signals of the numbers selected for the respective blocks B1.

5 Claims, 4 Drawing Sheets

|     |          |          |          |     |
|-----|----------|----------|----------|-----|
| L1{ | $a_{11}$ | $a_{12}$ | $a_{13}$ | --- |
| L2{ | $a_{21}$ | $a_{22}$ | $a_{23}$ | --- |
| L3{ | $a_{31}$ | $a_{32}$ | $a_{33}$ | --- |

FIG. 9B

| $a_{11}$ | $\Delta a_{12}$ | $\Delta a_{13}$ | --- |
|----------|-----------------|-----------------|-----|
| $a_{21}$ | $\Delta a_{22}$ | $\Delta a_{23}$ | --- |
| $a_{31}$ | $\Delta a_{32}$ | $\Delta a_{33}$ | --- |

FIG. 9C

| $a_{11}'$ | $\Delta a_{12}'$ | $\Delta a_{13}'$ | --- |
|-----------|------------------|------------------|-----|
| $a_{21}'$ | $\Delta a_{22}'$ | $\Delta a_{23}'$ | --- |
| $a_{31}'$ | $\Delta a_{32}'$ | $\Delta a_{33}'$ | --- |

METHOD OF COMPRESSING IMAGE SIGNALS BY VECTOR QUANTIZATION

BACKGROUND OF THE INVENTION

1. Field of the Invention

This invention relates to a method of compressing image signals. This invention particularly relates to a method of compressing image signals so that a high signal compressibility is obtained by utilizing vector quantization and encoding by orthogonal transformation or prediction encoding in combination with each other.

2. Description of the Prior Art

Image signals representing half tone images, such as television signals, are composed of enormous amounts of information, and a broad-band transmission line is required for transmission of the image signals. Such image signals involve much redundancy, and various attempts have been made to compress the image signals by restricting the redundancy. Also, in recent years, recording of half tone images on optical disks, magnetic disks, or the like has been generally put into practice. In this case, image signal compression is conducted generally for the purpose of efficiently recording image signals on a recording medium.

One of the methods of image signal compression that has heretofore been known is a method wherein vector quantization is utilized. The known method comprises the steps of (i) dividing two-dimensional image signals into blocks each comprising the signals at M×N number of picture elements adjacent to one another, (ii) selecting a vector that corresponds with the minimum distortion to the set of the image signals in each of the blocks from a code book comprising a plurality of vectors different from one another and prepared in advance by defining M×N number of vector elements, and (iii) encoding the information representing the selected vector to correspond to the block.

Since the image signals in the block as mentioned above have high correlation therebetween, the image signals in each block can be represented very accurately by one of a comparatively small number of vectors prepared in advance. Therefore, transmission or recording of the image signals can be carried out by transmitting or recording a code representing the vector, instead of the image signals themselves, and signal compression can thus be achieved. By way of example, the amount of the image signals at 64 picture elements in a half tone image of a density scale composed of 256 levels (=8 bits) is 8×64=512 bits. In the case where the 64 picture elements are grouped as a single block, the respective image signals in the block are expressed by a vector composed of 64 vector elements, and a code book including 256 such vectors is prepared, the amount of the signals per block becomes equal to the amount of the signals for discrimination between the vectors, i.e. 8 bits. Consequently, in this case, the amount of the signals can be compressed to 1/64.

After the image signals are compressed in the manner as mentioned above and recorded or transmitted in the compressed form, the vector elements of each of the vectors which the vector discriminating information represents are taken as reconstructed signals of each of the blocks, and the original image is reproduced by use of the reconstructed signals.

The aforesaid method of compressing image signals by vector quantization is advantageous for transmission of television signals and for other purposes. On the other hand, in recent years, an electronic image file for recording the images of very high gradation such as medical radiation images on the aforesaid optical disk or the like has attracted particular attention. For such purposes, a need exists for more efficient compression of the image signals.

SUMMARY OF THE INVENTION

The primary object of the present invention is to provide a method of compressing image signals, which improves the signal compressibility over the conventional method by utilizing the vector quantization technique.

Another object of the present invention is to provide a method of compressing image signals by vector quantization, which enables an increase in the number of images recordable on a recording medium or an increase in the signal transmission efficiency.

The first method of compressing image signals by vector quantization in accordance with the present invention is characterized by improving the signal compressibility by combining the vector quantization with encoding by orthogonal transformation.

Specifically, the present invention provides a first method of compressing image signals by vector quantization, which comprises the steps of:

i) dividing two-dimensional image signals into blocks B1 each of which is composed of signals at M×N number of picture elements adjacent to one another, ii) selecting a vector that corresponds with the minimum distortion to the set of the image signals in each of the blocks B1 from a code book comprising a plurality of vectors different from one another and prepared in advance by defining M×N number of vector elements, and iii) encoding a number representing the selected vector to correspond to each of the blocks B1, wherein the improvement comprises the steps of:

a) defining said number representing said selected vector so that said number is larger or smaller as the distortion of said vector in said code book with respect to a predetermined vector is larger, b) dividing group signals of said numbers selected for the respective blocks B1 into blocks B2, each of which is composed of P×Q number of samples, by putting together said group signals at the blocks B1 adjacent to one another, c) carrying out orthogonal transformation of said group signals in each of said blocks B2, and d) encoding the transformed signals obtained by said orthogonal transformation respectively with an intrinsic code length.

The second method of compressing image signals by vector quantization in accordance with the present invention is characterized by improving the signal compressibility by combining the vector quantization with prediction encoding.

Specifically, the present invention also provides a second method of compressing image signals by vector quantization, which comprises the steps of:

i) dividing two-dimensional image signals into blocks each of which is composed of signals at M×N number of picture elements adjacent to one another, ii) selecting a vector that corresponds with the minimum distortion to the set of the image signals in each of the blocks from a code book comprising a plurality of vectors different from one another and prepared in advance by defining M×N number of vector elements, and iii) encoding a number representing the selected vector to correspond to each of the blocks, wherein the improvement comprises the steps of:

a) defining said number representing said selected vector so that said number is larger or smaller as the distortion of said vector in said code book with respect to a predetermined vector is larger, and b) carrying out prediction encoding of group signals of said numbers selected for the respective blocks.

With the first and second methods of compressing image signals by vector quantization in accordance with the present invention, signal compression is achieved to an extent higher than with the conventional method of compressing image signals utilizing vector quantization. Therefore, particularly in the case where images such as high-gradation medical images are to be recorded, the number of the images recordable on a recording medium can be increased markedly. Also, in the case where the first or second method of compressing image signals by vector quantization in accordance with the present invention is applied to image signal transmission, the signal transmission path can be reduced markedly, or the transmission time can be shortened markedly.

Figure 2:
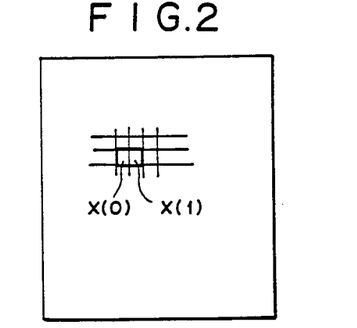
FIGS. 2, 3 and 4 are explanatory views showing the orthogonal transformation in the first method of compressing image signals by vector quantization in accordance with the present invention.
Figure 3:
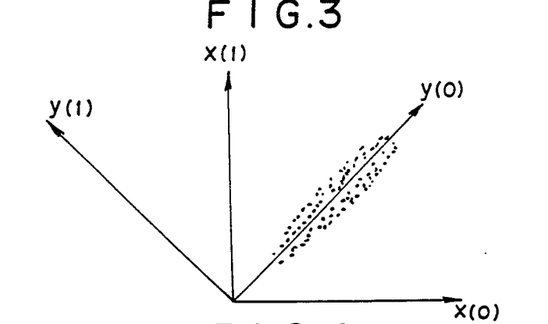

In general, the aforesaid encoding by orthogonal transformation is applied to the original image signals carrying a two-dimensional image for the purposes of signal compression. In this case, with the encoding by orthogonal transformation, the two-dimensional image signals are divided into blocks each of which is composed of an appropriate number of samples, and orthogonal transformation of a value string comprising the sample values is carried out for each block. Since energy is concentrated at a specific component by the orthogonal transformation, a component of high energy level is encoded (quantized) by allocating a long code length thereto, and a component of low energy level is encoded coarsely with a short code length, thereby reducing the number of codes per block. As the orthogonal transformation, Furier transformation, cosine transformation, Hadamard transformation, Karhunen-Love transformation, or Harr transformation is usually used. The aforesaid image signal compression method will hereinbelow be described in further detail by taking the Hadamard transformation as an example. As shown in FIG. 2, blocks are formed by dividing digital two-dimensional image signals in a unit of, for example, two signals in a predetermined one-dimensional direction. When sample values $x(0)$ and $x(1)$ in the block are plotted on an orthogonal coordinate system, since correlation therebetween is high as mentioned above, most of the sample values are distributed near the straight line represented by the formula $x(1)=x(0)$ as shown in FIG. 3. Therefore, as shown in FIG. 3, the orthogonal coordinate system is transformed by an angle of 45° to determine a new $y(0)$–$y(1)$ coordinate system. On the $y(0)$–$y(1)$ coordinate system, $y(0)$ represents the low frequency component of the original image signals prior to transformation, and attains a value slightly larger than $x(0)$ and $x(1)$ [a value approximately $\sqrt{2}$ times the values of $x(0)$ and $x(1)$]. On the other hand, values of $y(1)$ representing the high frequency component of the original image signals are distributed just within a very narrow range near the $y(0)$ axis. In the case where a code length of, for example, seven bits is required for encoding of $x(0)$ and $x(1)$, seven bits or eight bits are required for encoding of $y(0)$. On the other hand, $y(1)$ can be encoded with a code length of, for example, four bits. Consequently, the code length per block is shortened, and compression of the image signals is achieved.

Orthogonal transformation of second order wherein each block is constituted by two image signals is conducted as mentioned above. As the order is increased, the tendency of energy concentrating at a specific component is increased, and it becomes possible to improve the effect of decreasing the number of bits. In general, the aforesaid transformation can be conducted by use of an orthogonal function matrix. In an extreme case, when an intrinsic function of the objective image is selected as the orthogonal function matrix, the transformed image signals are constituted by the intrinsic value matrix, and the original image can be expressed just by the diagonal component of the matrix. Also, instead of dividing the image signals just in a single direction to form blocks as mentioned above, each block may be constituted by two-dimensional image signals. In this case, the effect of decreasing the number of bits is markedly improved over the one-dimensional orthogonal transformation.

Figure 4:
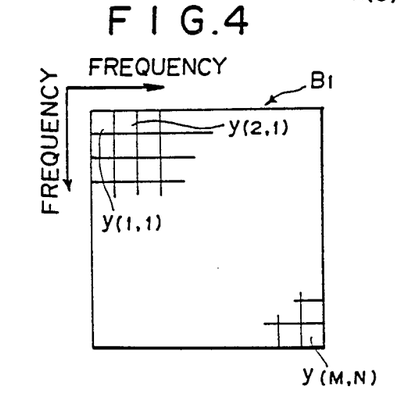

The transformed signals obtained by the aforesaid two-dimensional orthogonal transformation are arranged in the order of the sequence (i.e. the number of "0" position crossing) of the orthogonal function utilized for the transformation in each block. Since the sequence is correlated with the spatial frequency, the transformed signals are put side by side in the longitudinal and transverse directions in the order of the frequency as shown in FIG. 4. Therefore, the code length per block may be shortened by allocating a comparatively long code length to the transformed signals representing the low frequency component (i.e. the signals on the left upper side in FIG. 4) as in the case where a longer code length is allocated to $y(0)$ in the aforesaid one-dimensional orthogonal transformation of second order, and allocating a comparatively short code length or no code to the transformed signals representing the high frequency component (i.e. the signals on the right lower side in FIG. 4).

In the first method of compressing image signals by vector quantization in accordance with the present invention, instead of applying the aforesaid encoding by orthogonal transformation to the original image signals, the encoding by orthogonal transformation is applied to the signals of the numbers representing the vectors selected by vector quantization. In this case, signal compressing can be achieved by defining the vector numbers in the manner as mentioned above. Specifically, in the case where the vector numbers are defined in the manner as mentioned above, the numbers of the vectors become closer to one another as the defined vector distortions are smaller. On the other hand, the original image signals have high correlation among the picture elements close to one another in the block B1. Also, in the case where a plurality of the blocks B1 are considered, the correlation of the overall image signals becomes high among the blocks B1 that are close to one another. Therefore, the correlation among the vectors selected for the respective blocks B1 becomes high among the blocks B1 that are close to one another, and consequently the correlation among the numbers of the vectors becomes high. Accordingly, when the vector numbers are subjected to the encoding by orthogonal transformation, the code lengths necessary for representing the vector numbers can be reduced.

Also, the aforesaid prediction encoding is applied to the original image signals carrying a two-dimensional image for the purposes of signal compression. Image signals (remark image signals) have high correlation with image signals in the vicinity of the remark image signals. Therefore, when the values of the remark image signals are predicted from the values of the image signals in the vicinity of the remark image signals, the distribution of the prediction errors is concentrated in the vicinity of zero. In the aforesaid prediction encoding, by the utilization of the characteristics that the prediction errors are concentrated in the vicinity of zero, instead of encoding the actual image signals, the prediction errors which can be expressed with short codes are encoded. In this manner, the total amount of signals is compressed.

In the second method of compressing image signals by vector quantization in accordance with the present invention, instead of applying the aforesaid prediction encoding to the original image signals, the prediction encoding is applied to the signals of the numbers representing the vectors selected by vector quantization. In this case, signal compressing can be achieved by defining the vector numbers in the manner as mentioned above. Specifically, in the case where the vector numbers are defined in the manner as mentioned above, the numbers of the vectors become closer to one another as the defined vector distortions are smaller. On the other hand, the original image signals have high correlation among the picture elements close to one another in the block. Also, in the case where a plurality of the blocks are considered, the correlation of the overall image signals becomes high among the blocks that are close to one another. Therefore, the correlation among the vectors selected for the respective blocks becomes high among the blocks that are close to one another, and consequently the correlation among the numbers of the vectors becomes high. Accordingly, when the vector numbers are subjected to the prediction encoding, the code lengths necessary for representing the vector numbers can be reduced.

DESCRIPTION OF THE PREFERRED EMBODIMENTS

The present invention will hereinbelow be described in further detail with reference to the accompanying drawings.

Figure 1:
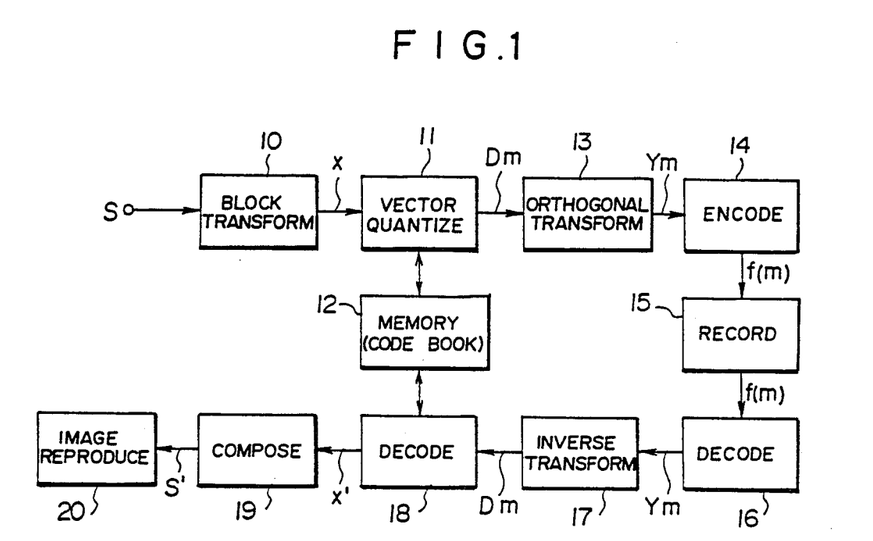
FIG. 1 is a block diagram showing the configuration of an apparatus for carrying out the first method of compressing image signals by vector quantization in accordance with the present invention.
Figure 5:
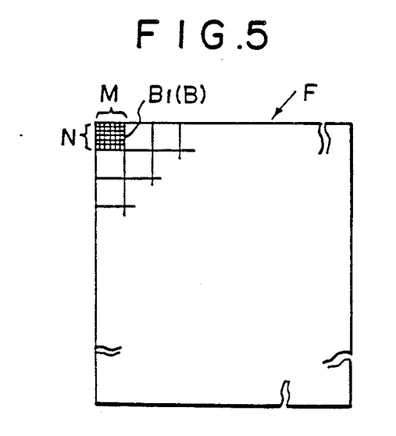
FIG. 5 is an explanatory view showing the division of image signals into blocks.

With reference to FIG. 1, original image signals S representing a single continuous tone image are fed to a block transformation circuit 10 in which they are transformed into original image signals x of each of rectangular blocks which comprises M×N picture elements. The division into the blocks is shown in FIG. 5. With reference to FIG. 5, F denotes the original image, and B1 denotes a single block. For simplicity of explanation, the block B1 is assumed to comprise 656 picture elements in the descriptions below.

The original image signals x of the block B1 are then fed to a vector quantizer 11. The vector quantizer 11 selects a vector, that corresponds with the minimum distortion to the set of the fed original image signals x of the block B1 (the set comprises 36 signals), from a plurality of vectors stored as a code book in a memory 12. Specifically, the memory 12 stores a code book representing, by way of example, 256 vectors $\bar{x}(1)$, $\bar{x}(2)$, $\bar{x}(3)$, ..., $\bar{x}(256)$ respectively defining 36 vector elements $x_1^{(n)}, x_2^{(n)}, \ldots, x_{36}^{(n)}$ where n=1, 2, ..., 256 as shown below.

$$\bar{x}(1) = (\hat{x}_1^{(1)}, \hat{x}_2^{(1)}, \hat{x}_3^{(1)} \ldots \hat{x}_{36}^{(1)})$$

$$\bar{x}(2) = (\hat{x}_1^{(2)}, \hat{x}_2^{(2)}, \ldots \hat{x}_{36}^{(2)})$$

$$\bar{x}(3) = (\hat{x}_1^{(3)}, \hat{x}_2^{(3)}, \ldots \hat{x}_{36}^{(3)})$$

$$\vdots$$

$$\bar{x}(256) = (\hat{x}_1^{(256)}, \hat{x}_2^{(256)} \ldots \hat{x}_{36}^{(256)})$$

The vector quantizer 11 finds a vector $\bar{x}(m)$ whose vector elements $(\hat{x}_1, \hat{x}_2, \hat{x}_3, \ldots, \hat{x}_{36})$ correspond with the minimum distortion to the set $(x_1, x_2, x_3, \ldots, x_{36})$ of the original image signals x, and outputs an encoded signal Dm which represents a vector identification number "m" representing the vector $\bar{x}(m)$. As the distortion, by way of example, the mean square error expressed as $$d = \frac{1}{k} \sqrt{\sum_{i=1}^{k} |x_i - \hat{x}_i|^2}$$

is utilized (k=36 in this example). In order to find such a vector $\bar{x}(m)$ that the distortion is the minimum, the distortion may be calculated for all of the vectors, and the vector x(m) exhibiting the minimum distortion may be found (this method is referred to as total search type vector quantization). Alternatively, in order to shorten the processing time, binary tree search type vector quantization may be carried out though the distortion may not completely become the minimum.

In this embodiment, the vectors $\bar{x}(2), \bar{x}(3), \ldots, \bar{x}(256)$ after the vector $\bar{x}(1)$ are put side by side in such a sequence that the distortion with respect to the vector $\bar{x}(1)$ is smaller. Specifically, by way of example, the distortion between the vector $\bar{x}(m)$ of the identification number "m" and the vector $\bar{x}(m+1)$ of the identification number (m+1) is smaller than the distortion between the vector $\bar{x}(m)$ and the vector $\bar{x}(m+2)$ of the identification number (m+2). The distortion may be defined by, for example, the aforesaid mean square error.

An appropriate code book comprising the vectors respectively defining the vector elements $\hat{x}_1, \hat{x}_2, \hat{x}_3, \ldots, \hat{x}_{36}$) may be prepared by preparing a training image of the same type as the image on which signal compression is to be carried out, and using a known method on the basis of the training image.

In this embodiment, the vector discrimination signal Dm may be such that the 256 vectors can be discriminated from one another, and can therefore be expressed by 8 bits. Therefore, in the case where the density scale of each picture element is of 256 levels (=8 bits), the image signals in the amount of 8 bits ×36 (picture elements) can be expressed by 8 bits, and the signal compressibility becomes 1/36.

Figure 6:
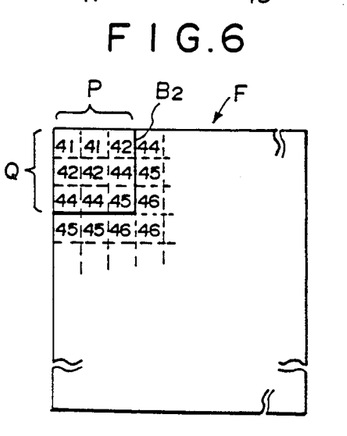
FIG. 6 is an explanatory view showing the division of vector discrimination signals into blocks in the first method of compressing image signals by vector quantization in accordance with the present invention.

The vector selection and the output of the vector discrimination signal Dm as mentioned above are carried out for all of the blocks B1 in a single image which the original image signals S represent. The vector identification numbers which the vector discrimination signals thus generated represent are distributed as shown in, for example, FIG. 6 for a single image. Specifically, in this embodiment, a single vector identification number is determined for 6×6=36 picture elements. Also, as mentioned above, the vector identification numbers have higher correlation among the blocks B1 that are closer to one another. As shown in FIG. 1, the vector discrimination signals Dm representing the vector identification numbers are fed to an orthogonal transformation circuit 13 and subjected therein to, for example, two-dimensional orthogonal transformation. As shown in FIG. 6, the two-dimensional orthogonal transformation is carried out for each of blocks B2 each of which is composed of P×Q number of the blocks B1 adjacent to one another. By way of example, in FIG. 6, 3×3=9 blocks B1 are taken as a single block B2.

By way of example, as the orthogonal transformation, Hadamard transformation as mentioned above may be used. Since the transformation matrix in Hadamard transformation is constituted just by +1 and −1, Hadamard transformation can be executed by use of a transformation circuit simpler than in the other orthogonal transformations. Also, as well known, two-dimensional orthogonal transformation can be reduced to one-dimensional orthogonal transformation. Specifically, the two-dimensional orthogonal transformation is carried out by subjecting the P×Q number of the vector discrimination signals Dm in the two-dimensional block B2 to one-dimensional orthogonal transformation in the longitudinal direction, and then subjecting the P×Q number of transformed signals thus obtained to one-dimensional orthogonal transformation in the transverse direction. The transformation in the longitudinal direction and the transformation in the transverse direction may be carried out in the reverse order.

The transformed signals Ym obtained by the two-dimensional orthogonal transformation are put side by side in each block B2 in the longitudinal and transverse directions in the order of the sequence of the function on which the orthogonal transformation is based (for example, the Walsh function in the case of Hadamard transformation, or the trigonometrical function in the case of Fourier transformation).

The transformed signals Ym put side by side in the order of the sequency of the function on which the two-dimensional orthogonal transformation is based are sent to a known encoding circuit 14 as shown in FIG. 1, and encoded (quantized) therein. As mentioned above, energy is concentrated at a specific component in the transformed signals Ym. Therefore, it is possible to decrease the number of bits required per block B2 and to achieve signal compression by allocating a comparatively long code length to the component with high energy, and allocating a comparatively short code length to or discarding the component with low energy.

Signals f(m) representing the vector identification numbers encoded in the manner as mentioned above are recorded on a recording medium (image file) such as an optical disk or a magnetic disk in a recording and reproducing apparatus 15. As mentioned above, the signals f(m) have been markedly compressed by vector quantization and encoding by orthogonal transformation as compared with the original image signals S. Therefore, a large number of the images can be recorded on the recording medium such as the optical disk.

In the course of image reproduction, the signals f(m) are read from the recording medium, and are decoded by a decoder 16 into the aforesaid transformed signals Ym. The transformed signals Ym thus decoded are sent to an inverse transformation circuit 17 and transformed inversely to the aforesaid two-dimensional orthogonal transformation. In this manner, the vector discrimination signals Dm representing the vector identification numbers are restored. The vector discrimination signals Dm indirectly representing the image signals are transformed by a decoder 18 into reconstructed signals x'. Specifically, the decoder 18 reads the vector, which the vector discrimination signal Dm fed thereto represents, from the code book stored in the memory 12, and outputs the vector elements $(\hat{x}_1, \hat{x}_2, \hat{x}_3, \ldots, \hat{x}_{36})$, which are defined for said vector, as the reconstructed signals x' for a single block B1.

The reconstructed signals x' are sent to a composing circuit 19 and transformed therein from the signals per block B1 to the signals per image. The image signals S' obtained by said transformation in the composing circuit 19 have slight distortion with respect to the original image signals S, and are approximately equal to the original image signals S. The image signals S' are ultimately sent to an image reproducing apparatus 20. In the image reproducing apparatus 20, an image approximately identical with the original image that the original image signals S represent is reproduced on the basis of the image signals S'.

An embodiment of the second method of compressing image signals by vector quantization in accordance with the present invention will hereinbelow be described with reference to FIG. 7.

In this embodiment, the original image signals S representing a single continuous tone image are fed to a block transformation circuit 10 in which they are transformed into original image signals x of each of rectangular blocks B which comprises M×N picture elements as shown in FIG. 5. For simplicity of explanation, each of the blocks B is assumed to comprise 6×6 picture elements in the descriptions below.

The original image signals x of the block B are then fed to the vector quantizer 11. In the same manner as in the embodiment shown in FIG. 1, the vector quantizer 11 selects the vector $\bar{x}(m)$, that corresponds with the minimum distortion to the set of the fed original image signals x of the block B1 (the set comprises 36 signals), from a plurality of vectors stored as the code book in the memory 12, and outputs the encoded signal Dm which represents the vector identification number "m" representing the vector x(m).

The vector selection and the output of the vector discrimination signal Dm as mentioned above are carried out for all of the blocks B in a single image which the original image signals S represent. The vector identification numbers which the vector discrimination signals thus generated represent are distributed as shown in, for example, FIG. 8 for a single image. Specifically, in this embodiment, a single vector identification number is determined for 6×6=36 picture elements. Also, as mentioned above, the vector identification numbers have higher correlation among the blocks B that are closer to one another.

Figure 7:
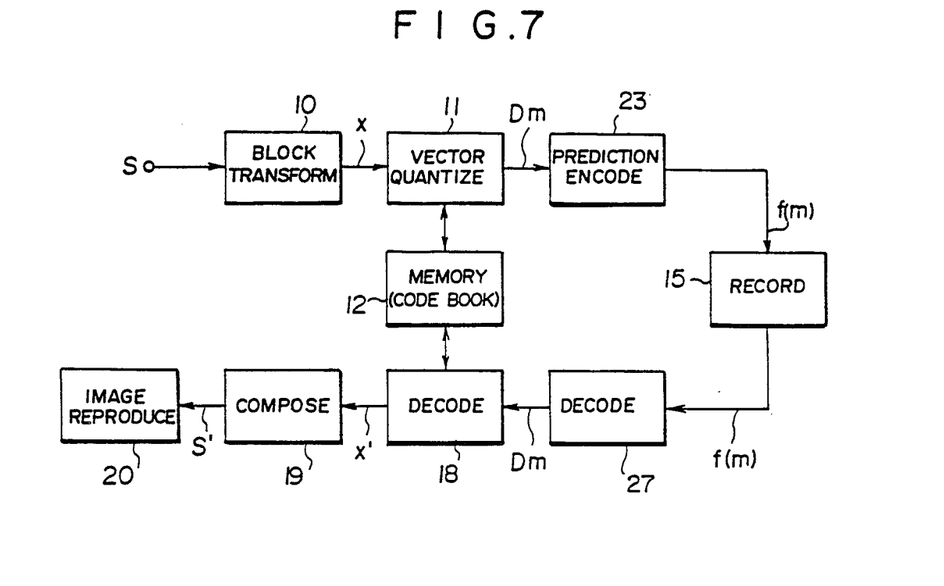
FIG. 7 is a block diagram showing the configuration of an apparatus for carrying out the second method of compressing image signals by vector quantization in accordance with the present invention.
Figure 8:
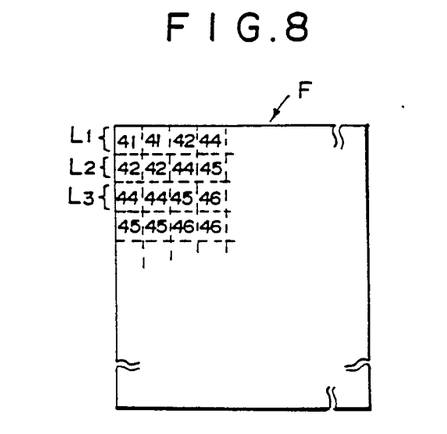
FIG. 8 is a schematic view showing examples of vector discrimination signals in the second method of compressing image signals by vector quantization in accordance with the present invention.
Figure 9A:
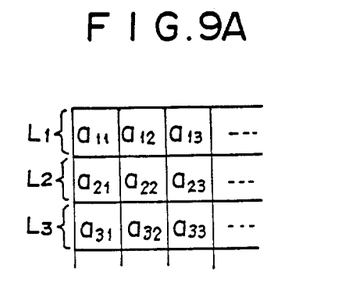
FIGS. 9A, 9B and 9C are explanatory views showing the prediction encoding of the vector discrimination signals in the second method of compressing image signals by vector quantization in accordance with the present invention.
Figure 9B:
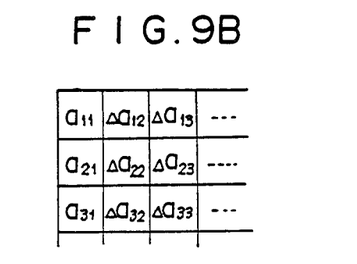

As shown in FIG. 7, the vector discrimination signals Dm representing th vector identification numbers are fed to a prediction encoding circuit 23 and subjected therein to previous value prediction plus Huffman encoding processing as an example of the prediction encoding processing methods. For explanation of prediction encoding processing, the group signals of the vector identification numbers as shown in FIG. 8 are generally indicated as shown in FIG. 9A. First the prediction encoding circuit 23 carries out previous value prediction for the aforesaid signals a11, a12, a13, ..., a21, a22, a23, ..., a31, a32, a33, ..., and calculates prediction errors $\Delta$a12, $\Delta$a13, ..., $\Delta$a22, $\Delta$a23, ..., $\Delta$a32, $\Delta$a33, ..., as shown in FIG. 9B. The image signals standing at the head of lines L1, L2, L3, ... are left as they are. With previous value prediction, the value of a remark signal is predicted to be equal to the value of the signal present prior to the remark signal, and the difference (i.e. the prediction error) between the predicted value (i.e. the value of the signal present prior to the remark signal) and the actual value of the remark signal is calculated. For example, the prediction errors are calculated as $$\Delta a12 = a12 - a11, \Delta a13 = a13 - a12, \ldots$$

$$\Delta a22 = a22 - a21, \Delta a23 = a23 - a22, \ldots$$

Figure 9C:
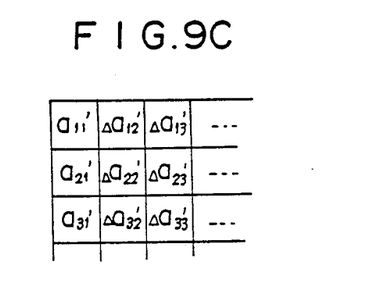

After calculating the prediction errors in the manner as mentioned above, the prediction encoding circuit 3 encodes the raw signals a11, a21, a31, ... standing at the head of the lines L1, L2, L3, ... and the prediction errors $\Delta$a12, $\Delta$a13, ..., $\Delta$a22, $\Delta$a23, ..., $\Delta$a32, $\Delta$a33, ... on the basis of a Huffman code table, and generates compressed signals a11', $\Delta$a12', $\Delta$a13', ... as shown in FIG. 9C. As mentioned above, the vector discrimination signals Dm representing the vector identification numbers can be compressed by carrying out prediction encoding in this manner.

Signals f(m) representing the vector identification numbers prediction-encoded in the manner as mentioned above are recorded on a recording medium (image file) such as an optical disk or a magnetic disk in the recording and reproducing apparatus 15. As mentioned above, the signals f(m) have been markedly compressed by vector quantization and prediction encoding as compared with the original image signals S. Therefore, a large number of the images can be recorded on the recording medium such as the optical disk.

In the course of image reproduction, the signals f(m) are read from the recording medium, and are decoded by a decoder 27 into the aforesaid vector discrimination signals Dm representing the vector identification numbers. Specifically, with decoding processing, the compressed signals as shown in FIG. 9C are decoded based on the Huffman code table which was used in the course of effecting the aforesaid Huffman encoding processing. In this manner, the raw signals tt the head of the respective lines and the prediction errors as shown in FIG. 9B are obtained. Then, by use of the raw signals at the head and the prediction errors obtained in this manner and the prediction formulas used in the course of the aforesaid previous vale prediction, the extended signals a11, a12, a13, ..., a21, a22, a23, ..., as shown in FIG. 9A are calculated as shown below.

$$a_{11} = a_{11}$$
$$a_{12} = a_{11} + \Delta a_{12}$$
$$a_{13} = a_{12} + \Delta a_{13}$$
$$\vdots$$
$$a_{21} = a_{21}$$
$$a_{22} = a_{21} + \Delta a_{22}$$
$$a_{23} = a_{22} + \Delta a_{23}$$
$$\vdots$$

The decoder 27 outputs the vector discrimination signals Dm (a group of the signals a11, a12, a13, ..., a21, a22, a23, ... ) decoded in the manner as mentioned above.

The vector discrimination signals Dm indirectly representing the image signals are transformed by the decoder 18 into reconstructed signals x'. Specifically, the decoder 18 reads the vector, which the vector discrimination signal Dm fed thereto represents, from the code book stored in the memory 12, and outputs the vector elements ($\hat{x}_1, \hat{x}_2, \hat{x}_3, \ldots, \hat{x}_{36}$), which are defined for said vector, as the reconstructed signals x' for a single block B.

The reconstructed signals x' are sent to the composing circuit 19 and transformed therein from the signals per block B to the signals per image. The image signals S' obtained by said transformation in the composing circuit 19 have slight distortion with respect to the original image signals S, and are approximately equal to the original image signals S. The image signals S' are ultimately sent to the image reproducing apparatus 20. In the image reproducing apparatus 20, an image approximately identical with the original image that the original image signals S represent is reproduced on the basis of the image signals S'.

In the embodiments shown in FIGS. 1 and 7, the vector identification numbers 2, 3, 4, ..., 256 are assigned to the vectors put side by side in such a sequence that the distortion with respect to the vector $\bar{x}(1)$ is smaller. Instead, the identification number 256 may be assigned to a predetermined vector $\bar{x}$, thereby to indicate it as $\bar{x}(256)$, and the vector identification numbers 255, 254, 253, ..., 3, 2, 1 may be assigned to the vectors put side by side in such a sequence that the distortion with respect to the vector $\bar{x}(256)$ is smaller. Also, the predetermined vector which is taken for reference in assignment of the identification numbers to the respective vectors $\vec{x}$ and putting them side by side may be a vector that is not defined in the code book.

I claim:

1. A method of compressing image signals by vector quantization, which comprises the steps of:
   i) dividing two-dimensional image signals into blocks B1 each of which is composed of signals at M×N number of picture elements adjacent to one another,
   ii) selecting a vector that corresponds with the minimum distortion to said M×N number of image signals in each of the blocks B1 from a code book comprising a plurality of vectors different from one another and prepared in advance by defining M×N number of vector elements, and
   iii) encoding a number representing the selected vector to correspond to each of the blocks B1,
   wherein the improvement comprises the steps of:
   a) defining said number representing said selected vector so that said number is larger or smaller as the distortion of said vector in said code book with respect to a predetermined vector is larger,
   b) dividing group signals of said numbers selected for the respective blocks B1 into blocks B2, each of which is composed of P×Q number of samples, by putting together said group signals at the blocks B1 adjacent to one another,
   c) carrying out orthogonal transformation of said group signals in each of said blocks B2, and
   d) encoding the transformed signals obtained by said orthogonal transformation respectively with an intrinsic code length.

2. A method as defined in claim 1 wherein said orthogonal transformation is two-dimensional orthogonal transformation.

3. A method as defined in claim 1 or 2 wherein said orthogonal transformation is Hadamard transformation.

4. A method of compressing image signals by vector quantization, which comprises the steps of:
   i) dividing two-dimensional image signals into blocks each of which is composed of signals at M×N number of picture elements adjacent to one another,
   ii) selecting a vector that corresponds with the minimum distortion to said M×N number of image signals in each of the blocks from a code book comprising a plurality of vectors different from one another and prepared in advance by defining M×N number of vector elements, and
   iii) encoding a number representing the selected vector to correspond to each of the blocks,
   wherein the improvement comprises the steps of:
   a) defining said number representing said selected vector so that said number is larger or smaller as the distortion of said vector in said code book with respect to a predetermined vector is larger, and
   b) carrying out prediction encoding of group signals of said numbers selected for the respective blocks.

5. A method of compressing image signals by vector quantization, which comprises the steps of:
   (i) dividing two-dimensional image signals into blocks each of which is composed of signals at M×N number of picture elements adjacent to one another.
   (ii) selecting a vector that corresponds with the minimum distortion to said M×N number of image signals in each of the blocks from a code book comprising a plurality of vectors different from one another and prepared in advance by defining M×N number of vector elements, and
   (iii) encoding a number representing a selected vector to correspond to each of the blocks,
   wherein the improvement comprises the steps of:
   (a) defining said number representing said selected vector so that said number is larger or smaller as the distortion of said vector in said code book with respect to a predetermined vector is larger, and
   (b) carrying out prediction encoding of group signals of said numbers selected for the respective blocks, wherein said prediction encoding comprises previous value prediction plus Huffman encoding processing.

* * * * *